(12) United States Patent
Hahn et al.

(10) Patent No.: US 8,240,702 B2
(45) Date of Patent: Aug. 14, 2012

(54) AIRBAG FASTENING DEVICE WITH SLIDE

(75) Inventors: Ernst-Ludwig Hahn, Rabenau (DE);
Wolfgang Werner, Reutlingen (DE);
Siegfried Lautner, Gmeund (DE);
Hermann-Josef Lohmer, Sindelfingen (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 12/784,952

(22) Filed: May 21, 2010

(65) Prior Publication Data

US 2010/0295273 A1   Nov. 25, 2010

(30) Foreign Application Priority Data

May 22, 2009  (DE) .......................... 10 2009 022 323

(51) Int. Cl.
*B60R 21/20* (2011.01)

(52) U.S. Cl. .................................................. 280/728.2

(58) Field of Classification Search ............... 280/728.2, 280/730.2; 24/297, 453, 458
See application file for complete search history.

(56) References Cited

U.S. PATENT DOCUMENTS

| | | | |
|---|---|---|---|
| 4,457,482 A | 7/1984 | Kitagawa | |
| 5,937,745 A | 8/1999 | Boe | |
| 6,504,101 B2 | 1/2003 | Kondoh | |
| 6,851,702 B2 * | 2/2005 | Henderson et al. | 280/728.2 |
| 7,207,529 B2 | 4/2007 | Rosemann et al. | |
| 7,338,068 B2 | 3/2008 | Kawai et al. | |
| 7,699,339 B2 * | 4/2010 | Jang et al. | 280/728.2 |
| 7,735,855 B2 * | 6/2010 | Jang et al. | 280/728.2 |
| 7,837,225 B2 * | 11/2010 | Gosis et al. | 280/730.2 |
| 7,887,086 B2 * | 2/2011 | Kalandek | 280/728.2 |
| 2004/0169358 A1 | 9/2004 | Fujita et al. | |
| 2006/0192368 A1 * | 8/2006 | Hall et al. | 280/730.2 |
| 2006/0255568 A1 | 11/2006 | Demel et al. | |
| 2007/0158931 A1 | 7/2007 | Baumgartner et al. | |
| 2008/0048418 A1 | 2/2008 | Remley et al. | |
| 2008/0084050 A1 | 4/2008 | Volkmann et al. | |
| 2008/0238046 A1 | 10/2008 | Giddings et al. | |
| 2009/0020986 A1 | 1/2009 | Baumgartner et al. | |
| 2010/0127485 A1 | 5/2010 | Fukawatase et al. | |

FOREIGN PATENT DOCUMENTS

| | | |
|---|---|---|
| EP | 1975013 A | 10/2008 |
| EP | 1975013 A2 * | 10/2008 |
| WO | 2008139297 A | 11/2008 |

* cited by examiner

*Primary Examiner* — Paul N Dickson
*Assistant Examiner* — Robert A Coker
(74) *Attorney, Agent, or Firm* — Michael P. Leary

(57) ABSTRACT

A fastening device for the airbag, in particular a window airbag, is provided, having a retainer to which the airbag can be fastened and that has an opening through which a mounting stud can be passed. Fastened to the retainer is a slide element that can be slid from an open position into a fastened position and the stud is captured in the opening by the slide in the fastened position.

7 Claims, 1 Drawing Sheet

AIRBAG FASTENING DEVICE WITH SLIDE

CROSS-REFERENCE TO RELATED APPLICATIONS

This application claims priority from German Patent Application No. 10 2009 022 323.1, filed on May 22, 2009, the disclosure of which is incorporated herein by reference.

BACKGROUND OF THE INVENTION

The present invention concerns a fastening device for an airbag, in particular a window bag (window airbag), of a motor vehicle, having a retainer to which the airbag can be fastened and that has an opening through which a mounting stud can be passed.

It is known to fasten a window bag to the body of a motor vehicle using a fastening device. The fastening device has a retainer by which the window bag is held. For its part, this retainer has a circular opening with which it is placed on a T-shaped mounting stud. The T-stud is welded to the body of the motor vehicle by means of a stud welding system. A metal pin is inserted into the retainer, thereby gripping beneath the T-stud. By this means, the retainer, and consequently also the entire fastening device including the airbag, is securely mounted on the body. In this process, the pin is pushed into the retainer in the X direction, i.e., the direction of travel of the vehicle. In general, this method of fastening can be performed by the installer only by hand and is inconvenient.

Moreover, because the fastening of window bags is a class A item, its quality must be fully documented. In fastening methods currently in use, this is done by a second worker. Only in this way is it possible to ensure that optimal attachment of the window bag to the body is achieved. However, this overall installation effort is very great.

BRIEF SUMMARY OF THE INVENTION

The object of the present invention is consequently to fasten an airbag, and in particular a window bag, to the body of a motor vehicle with little effort but nevertheless reliably.

According to the invention, this object is attained by a fastening device according to claim 1. Further developments of the invention are evident from the dependent claims.

Accordingly, a fastening device for an airbag, in particular a window bag, of a motor vehicle is provided, having a retainer to which the airbag can be fastened and that has an opening through which a mounting stud can be passed. Fastened to the retainer is a slide element that can be slid from an open position into a fastening position. Moreover, when in the fastening position the slide element projects into or over the opening to engage the stud. With the slide element, a simple and reliable fastening of the airbag to the body can be ensured.

The retainer is preferably injection-molded from plastic. The slide element can likewise be injection-molded from plastic. Furthermore, it is desirable for the slide element to latch into the fastening position. It is likewise advantageous for the slide element to have a semicircular section that projects into the opening in the retainer in the fastening position. Lastly, an airbag can be fastened to the body of a vehicle with such a fastening device in that the slide element is pushed vertically upward from below into the fastening position on the vehicle.

BRIEF DESCRIPTION OF THE SEVERAL VIEWS OF THE DRAWING

The present invention is explained in detail below with reference to the drawings, which show.

DETAILED DESCRIPTION OF THE PREFERRED EMBODIMENTS

The exemplary embodiments described in detail below represent preferred embodiments of the present invention.

Figure 1:
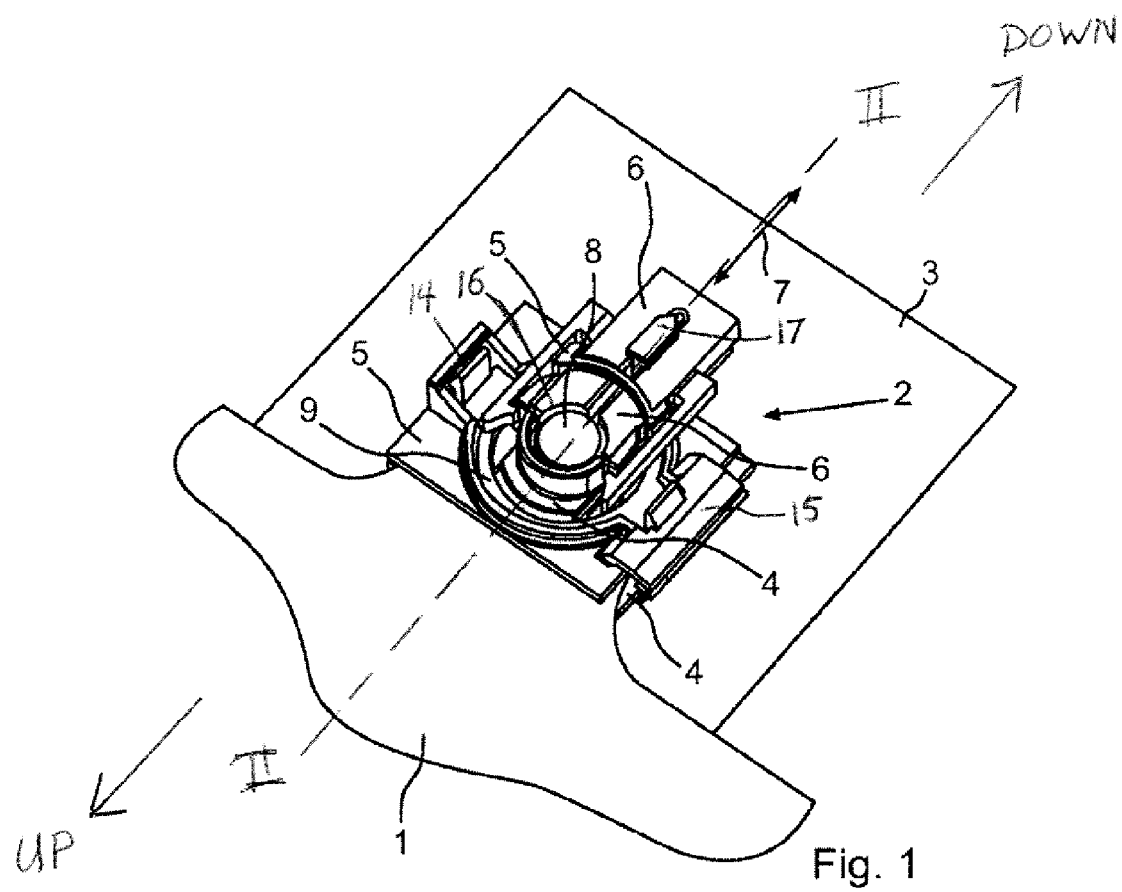
FIG. 1 a top view of an airbag with an inventive retainer in the installed state.

FIG. 1 shows a window bag 1 that is fastened to a body 3 with a fastening device 2. The fastening device 2 has a retainer, which in the present example consists essentially of two parts, a bottom part 4 and a top part 5. These two parts 4 and 5 are approximately plate-shaped, and the window bag 1 is clamped between them. To this end, the two parts 4 and 5 are joined together with a snap 14 or are fastened together in another manner. For example, the two parts can also be joined to one another with a hinge 15. They are preferably made by plastic injection molding, but can also be made of metal.

Fastened here to the top part 5 of the retainer is a slide element 6. It can be slid along the part 5 in the direction of the arrow 7. In FIG. 1, the slide element 6 is located in a fastening or closed position, in which the fastening device 2, including the window bag 1, is securely attached to the body 3. In this closed position, the slide element 6 latches in a section of the bottom part 4 of the retainer here.

Located in the center of the bottom part 4 of the retainer is an opening 11, through which extends a mounting stud 8. The mounting stud 8 is welded to the body 3 (see also FIG. 2).

An opening 9 is provided in the top part 5 of the retainer as well; visible through this opening is the bottom part 4 with its opening 11 and the mounting stud 8. In the fastening position shown in FIGS. 1 and 2, the slide 6 extends not only into the circumference C of the large opening 9 of the top part 5, but also into the smaller opening 11 of the bottom part 4. In this context, "to extend into" means that, as in the FIG. 2 view, the slide 6 projects into the circumference region of the opening 11 of the bottom part 4.

Figure 2:
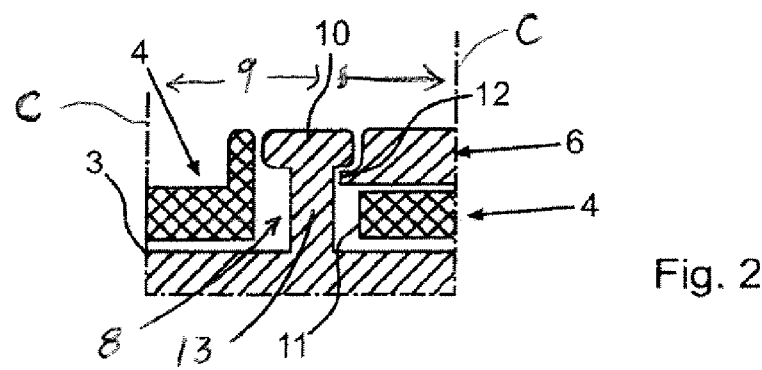
FIG. 2 a schematic cross sectional (along line II-II) representation of the interlocking of a slide element of the fastening device with a mounting stud.

The way the slide element 6 interlocks with the mounting stud 8 is clear from FIG. 2. The mounting stud 8 is T-shaped, has a head 10, and its shank 13 is welded to the body 3. The fastening device 2 is placed on the mounting stud 8 through the opening 11 in the bottom part 4 of the retainer. The slide element 6, which here preferably is also injection-molded from plastic, has a projection 12, which is formed in a semicircle 16 to embrace the shank 11 of mounting stud 8 and grips beneath the head 10 of the mounting stud 8. By this means, it is prevented that the fastening device 2 can come off the mounting stud 8 when the slide 6 is in the closed position. As mentioned above, the slide element 6 latches 17 into this fastening position.

With the fastening device 2 shown, it is possible to render unnecessary the principle of dual control for the installation of window bags if the installation proceeds with the following steps:

The retainer 2 (also called clip) is pre-installed on the window bag 1.

The worker installs the window bag in a bodyshell opening in the body 3 of the motor vehicle and places the retainer 2 over the stud 8 through openings 9 and 11.

An installation tool, which is used to move the slide or slide element 6 of the fastening device 2, is latched onto the vehicle.

The installation tool is triggered by hand, and slides the slide element 6 in the sliding direction 7 into the closed position.

The precise sliding travel of the slide element 6 is transmitted to a central computer by means of a travel query of the installation tool.

If applicable, the number of slide elements to be moved on the vehicle is queried by means of a counter.

The installation tool is unlatched.

As an alternative to this installation process, the slide element can also be pushed into the mounting position by hand or with pliers.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. An airbag retainer for securing an airbag, in particular a window airbag of a motor vehicle, to a fastening point, for example a weld stud including a head and a shank, inside a vehicle body, the retainer comprising:
    an airbag retainer body comprising a clamp, the clamp including a first part and a second part, and wherein the first part and the second part are arrangeable in an assembled condition on opposite sides of a portion of the airbag, in order to sandwich and clamp the portion of the airbag between the first part and the second part, and the first part defines an opening through which the stud can be passed and the second part defines a second opening larger than the first opening such that the first part is visible through the second opening when the airbag retainer is in the assembled condition;
    a slide element slidably mounted on the second part and movable to a fastened position; and
    wherein the fastened position the slide element engages the weld stud such that the retainer will not come off the weld stud.

2. An airbag retainer according to claim 1, wherein the clamp further including a hinge that flexibly joins the first part and the second part.

3. An airbag retainer according to claim 1, wherein the clamp further includes a clip for holding together the first part and the second part when the portion of the airbag is clamped in between.

4. An airbag retainer according to claim 1, further comprising a latch engageable with the slide element to hold the slide element in the fastened position.

5. An airbag retainer according to claim 1, characterized in that the retainer body is injection-molded from plastic.

6. An airbag retainer according to claim 1, characterized in that the slide element is injection-molded from plastic.

7. An airbag retainer according to claim 1, characterized in that the slide element includes a semicircular edge that projects into the first opening in the first part of the retainer body when the slide element is in the fastened position.

* * * * *